United States Patent
Boggess

(10) Patent No.: US 10,392,880 B2
(45) Date of Patent: Aug. 27, 2019

(54) SMALL FOOTPRINT COILED TUBING APPARATUS

(71) Applicant: Gregg Marine, Inc., Moss Landing, CA (US)

(72) Inventor: Ronald Boggess, Livingston, TX (US)

(73) Assignee: Gregg Drilling, LLC, Signal Hill, CA (US)

( * ) Notice: Subject to any disclaimer, the term of this patent is extended or adjusted under 35 U.S.C. 154(b) by 0 days.

(21) Appl. No.: 15/835,633

(22) Filed: Dec. 8, 2017

(65) Prior Publication Data

US 2018/0355686 A1     Dec. 13, 2018

Related U.S. Application Data

(63) Continuation of application No. PCT/US2015/034789, filed on Jun. 9, 2015.

(51) Int. Cl.
| | | |
|---|---|---|
| E21B 19/22 | (2006.01) |
| B29C 53/20 | (2006.01) |
| E21B 17/20 | (2006.01) |
| E21B 19/00 | (2006.01) |
| E21B 47/00 | (2012.01) |

(52) U.S. Cl.
CPC .............. *E21B 19/22* (2013.01); *B29C 53/20* (2013.01); *E21B 17/206* (2013.01); *E21B 19/008* (2013.01); *E21B 47/0006* (2013.01)

(58) Field of Classification Search
CPC ............................... E21B 19/22; E21B 19/008
See application file for complete search history.

(56) References Cited

U.S. PATENT DOCUMENTS

| | | | |
|---|---|---|---|
| 3,896,646 A | 7/1975 | Lange | |
| 4,266,724 A | 5/1981 | DiPalma | |
| 4,284,249 A | 8/1981 | Legallasi | |
| 4,410,297 A | 10/1983 | Lynch | |
| 5,826,654 A * | 10/1998 | Adnan | E21B 19/22 |
| | | | 166/250.01 |
| 6,000,480 A * | 12/1999 | Eik | E21B 19/008 |
| | | | 166/350 |
| 6,419,424 B1 | 7/2002 | Null et al. | |
| 7,029,206 B2 | 4/2006 | Stocksill | |
| 7,165,619 B2 * | 1/2007 | Fox | E21B 7/124 |
| | | | 166/343 |

(Continued)

FOREIGN PATENT DOCUMENTS

SU            804070 U      2/1981

OTHER PUBLICATIONS

International Search Report and Written Opinion, International Application No. PCT/US2015/034789 dated Dec. 4, 2015.

*Primary Examiner* — Matthew R Buck
*Assistant Examiner* — Aaron L Lembo
(74) *Attorney, Agent, or Firm* — Richard A. Fagin

(57) ABSTRACT

A coiled tubing conveyance apparatus includes a tubing injector and a guide roller frame having a coiled tubing reel attached thereto movably mounted on the tubing injector. The guide roller frame includes at least one guide roller to straighten a coiled tubing extended from the coiled tubing reel. A transverse motion apparatus is coupled to the tubing injector and the guide roller frame such that the guide roller frame is movable transversely with respect to a direction of motion of coiled tubing through the tubing injector.

16 Claims, 2 Drawing Sheets

(56) References Cited

U.S. PATENT DOCUMENTS

| | | | |
|---|---|---|---|
| 7,753,112 B1 | 7/2010 | Reynolds | |
| 8,752,617 B2 * | 6/2014 | Borst | E21B 19/22 166/77.1 |
| 2004/0094305 A1 * | 5/2004 | Skjærseth | E21B 7/124 166/339 |
| 2006/0000619 A1 * | 1/2006 | Borst | E21B 19/22 166/384 |
| 2006/0283605 A1 * | 12/2006 | Wood | B65H 49/38 166/380 |
| 2017/0321490 A1 * | 11/2017 | Haavind | E21B 15/02 |

* cited by examiner

SMALL FOOTPRINT COILED TUBING APPARATUS

CROSS-REFERENCE TO RELATED APPLICATIONS

Continuation of International Application No. PCT/US2015/034789 filed on Jun. 9, 2015 and incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not Applicable

BACKGROUND

This disclosure relates generally to the field of coiled tubing conveyance apparatus. More specifically, the disclosure relates to coiled tubing conveyance apparatus having a relatively small deployment area or "footprint" that may be used for purposes, among others, for shallow sediment evaluation below the bottom of a body of water.

Coiled tubing apparatus known in the art for use in wellbore construction and intervention operations include a reel on which a continuous length of flexible conduit or tubing is mounted. The reel may be transported to a wellbore location on a road vehicle such as a truck, or for marine wellbore operations on a skid which may be supported on a platform above the water surface. A device known as a "gooseneck" may be deployed on the same or on a different skid or vehicle. A gooseneck includes a plurality of rollers arranged on a curved frame to enable the flexible conduit to be redirected from a direction tangent to the reel to a direction generally vertical above a wellbore. A tubing injector is disposed above the wellbore and include traction rollers to move the tubing into the wellbore or out of the wellbore.

An example of such a coiled tubing unit known in the art is described in U.S. Pat. No. 6,719,043 issued to Austbo et al. FIG. 1. shows such coiled tubing apparatus, wherein the tubing injector is shown and generally designated by the numeral 10. The injector 10 is shown positioned above a wellhead 12 of a well 13 at a ground surface or subsea floor 14. A lubricator or stuffing box 16 is connected to the upper end of the wellhead 12. The tubing 18, having a longitudinal central axis 20 and an outer diameter or outer surface 22, is supplied on a large drum, or reel 24 and is typically several thousand feet in length. The tubing 18 of sufficient length, such as 10,000 feet or greater, may be inserted into the well 13 either as single tubing, or as tubing spliced by connectors or by welding. Outer diameters of the tubing 18 typically range from approximately one inch (2.5 cm) to approximately five inches (12.5 cm). The injector 10 is readily adaptable to even larger diameters. The tubing 18 is normally spooled from the reel 24 typically supported on a truck (not shown) for mobile operations. The injector 10 is mounted above the wellhead 12 on legs 26. A guide framework, that is, a gooseneck 28 having a plurality of pairs of guide rollers 30 and 32 rotatably mounted thereon extends upwardly from the injector 10. The tubing 18 is supplied from the reel 24 and is run between the rollers 30 and 32. As the tubing 18 is unspooled from the reel 24, generally it will pass adjacent to a measuring device, such as a wheel 34. Alternatively, the measuring device may be part of the injector 10, such as described in U.S. Pat. No. 5,234,053, issued to Connell.

The rollers 30 and 32 define a pathway for the tubing 18 so that the curvature in the tubing 18 is slowly straightened as it enters the injector 10. The tubing 18 is preferably formed of a material which is sufficiently flexible and ductile that it can be curved for storage on the reel 24 and also later straightened. The rollers 30 and 32 are spaced such that straightening of the tubing 18 is accomplished wherein the tubing 18 is inserted into the well 13 without kinks or undue bending on the tubing 18.

In some circumstances, for example, in a self contained coiled tubing apparatus to be deployed on a single vehicle or skid, or in environmentally sensitive areas, it may be desirable to minimize the area occupied by the coiled tubing apparatus.

DETAILED DESCRIPTION

Figure 1:
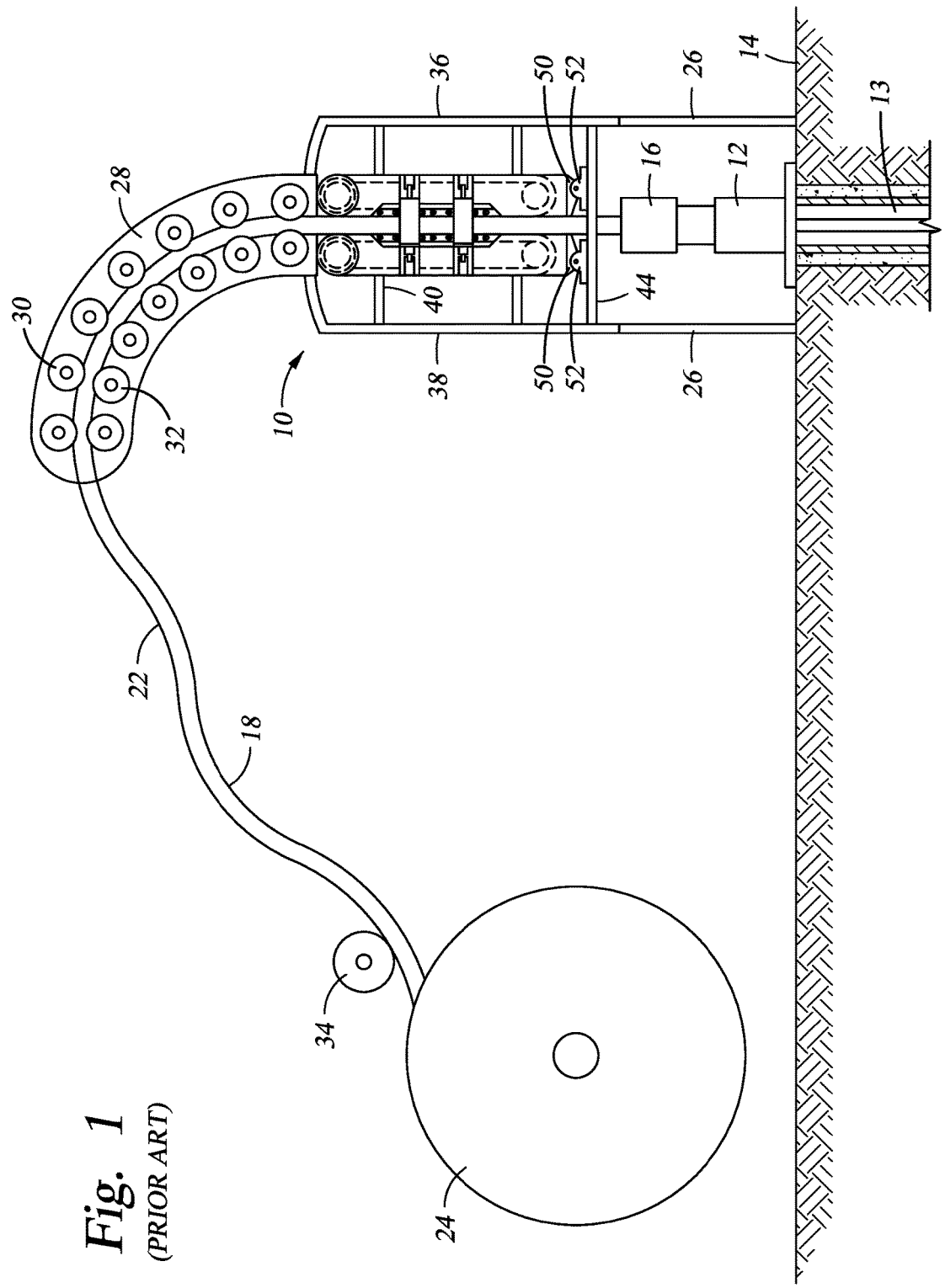
FIG. 1 shows an example coiled tubing unit known in the art.
Figure 2:
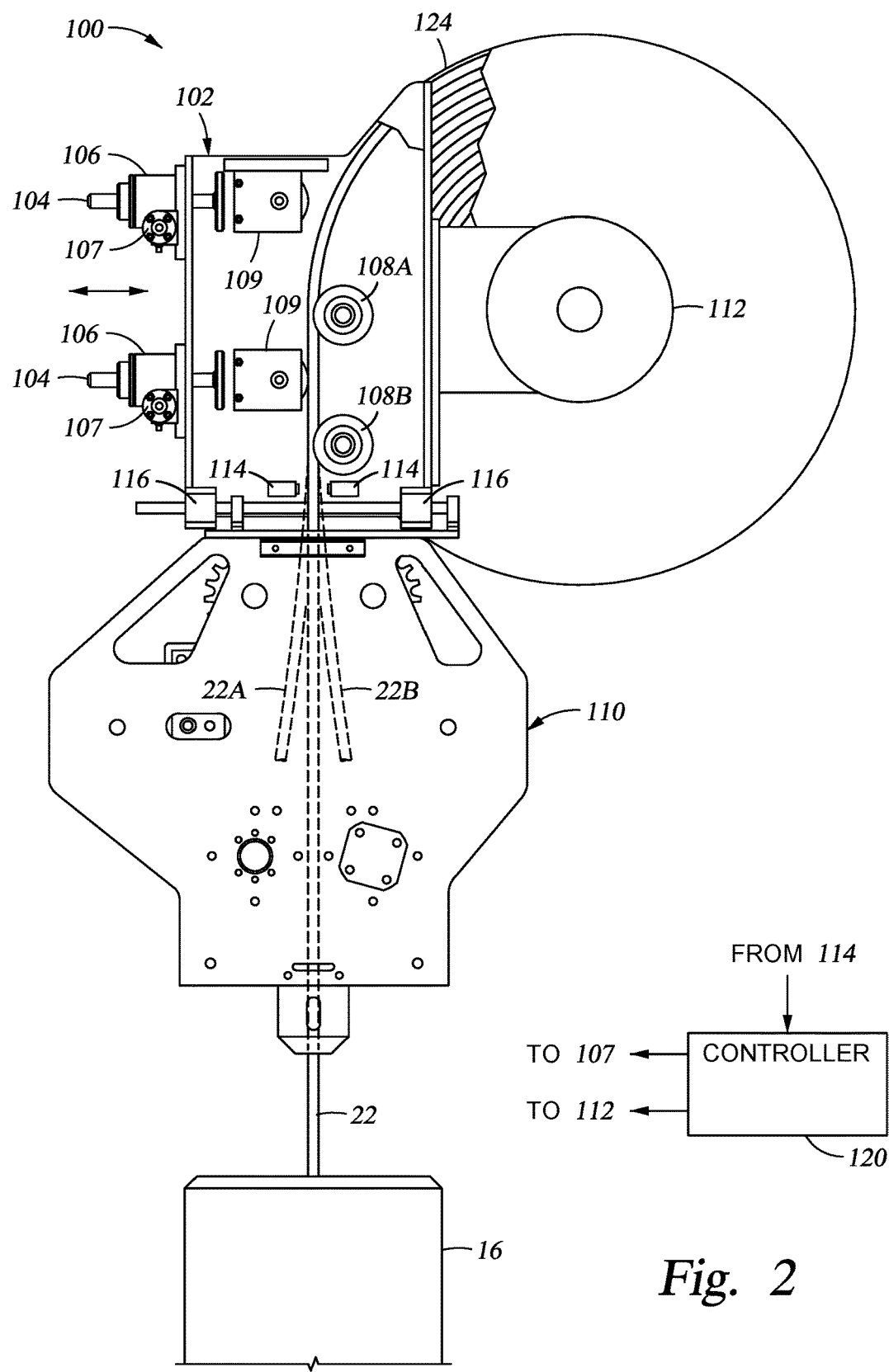
FIG. 2 shows an example embodiment of a coiled tubing unit according to the present disclosure.

FIG. 2 shows an example embodiment of a coiled tubing apparatus according to the present disclosure. The coiled tubing unit 100 is shown disposed above a pressure control apparatus such as a stuffing box 16, which may be affixed to the top of a wellhead (12 in FIG. 1) substantially as explained in the Background section herein so that a coiled tubing 22 may be inserted into and removed from a well (13 in FIG. 1) for any well or soil construction, sampling, coring, testing or intervention operation known in the art to be conducted on coiled tubing.

The coiled tubing apparatus 100 may include a reel 124 on which a length of coiled tubing 22 is disposed, substantially as explained with reference to FIG. 1 in the Background section herein. The reel 124 may be rotated by a motor 112, which may be, for example, an electric, pneumatic or hydraulic motor. The reel 124 may be rotatably mounted to a guide roller frame 102. The guide roller frame 102 may include one or more guide rollers 108 which serve to straighten the coiled tubing 22 as it is unwound from the reel 124 to be moved through a tubing injector 110, or conversely, to enable suitable kink-free bending of the coiled tubing 22 when it is retracted from the well (13 in FIG. 1) by the tubing injector 110 and moved onto the reel 124.

The tubing injector 110 may be configured similarly to any coiled tubing injector known in the art, including but not limited to the injector described with reference to FIG. 1. The guide roller frame 102 may include an upper guide roller 108A and a lower guide roller 108B affixed to the guide roller frame 102 and positioned such that the coiled tubing 22 is straightened as it is extended from the reel 124, and conversely, applies suitable bending to the coiled tubing 22 as it is retracted onto the reel 124. Reactive force to obtain the required bending in the coiled tubing 22 may be provided by one or more pinch rollers 109 mounted on the guide roller frame 102.

The guide roller frame 102 may be mounted above the tubing injector 110, for example, on linear bearings 116 such that the guide roller frame 102 is movable in a direction transverse to the motion of the coiled tubing 22 through the tubing injector 110. In the present example embodiment, the coiled tubing 22 moves into and out of a well (13 in FIG. 1), or into and out of subsurface sediments substantially vertically, therefore the motion of the guide roller frame 102 with respect to the tubing injector 110 may be substantially horizontal. While the present example embodiment has the movement of the guide roller frame 102 substantially transverse to the tubing injector 110, in other embodiments the guide roller frame 102 may be movable such that some amount of motion along the direction of the coiled tubing 22 takes place. For purposes of defining the scope of the present disclosure, it is only required that the movement of the guide roller frame with respect to the tubing injector 110 have sufficient transverse component such that the coiled tubing 22 at the point of its extension off the reel 124 is substantially above the tubing injector 110.

The guide roller frame 102 may be mounted to the tubing injector 110 using linear bushings or bearings 116 of any type known in the art. The above described transverse motion of the guide roller frame 102 relative to the tubing injector 110 may be obtained using jack screws 104 rotatably mounted to the guide roller frame 102. The jack screws 104 may be disposed in rotatable ball nuts 106 mounted to the guide roller frame 102. Rotation of the ball nuts 106 may be performed manually, however, in the present embodiment, rotation of the ball nuts 106 may be performed by respective motors 107 such that remote operation of the described transverse motion apparatus may be performed. The motors 107 may be, for example, electric motors, hydraulic motors or pneumatic motors.

The above described jack screws 104, ball nuts 106 and motors 107 are only one example of a transverse motion apparatus that may be remotely operable. It will be readily appreciated by those skilled in the art that other transverse motion apparatus may be used to obtain the same result, for example hydraulic or pneumatic cylinder/ram combinations mounted between the guide roller frame 102 and the tubing injector 110.

In the present example embodiment, operation of the transverse motion apparatus may be automated to maintain the guide roller frame 102 in the correct position with respect to the tubing injector 110 at all times such that the coiled tubing 22 enters or is withdrawn from tubing injector 110 substantially straight. In the present example embodiment, one or more bend sensors 114 may be disposed on the guide roller frame 102 on either side of the coiled tubing 22. The bend sensors 114 may be, for example, photoelectric sensors and a light source to enable detection of any movement of the coiled tubing away from vertical. Such movement is shown in phantom at 22A and 22B in FIG. 2 and would result from the coiled tubing 22 being bent at a position directly above the tubing injector 110. In other embodiments, the bend sensors 114 may be electrical load cells or strain gauges coupled to respective contact wheels such that bending strain in the coiled tubing 22 either direction away from directly above the tubing injector 110 will generate a signal indicative of bending strain in the coiled tubing 22.

The bend sensors 114 may be in signal communication with a controller 120. The controller 120 may be, for example, a programmable logic controller, a microprocessor or any other control device that accepts signal input from the bend sensors 114 and generates a control signal output to operate the transverse motion apparatus and the reel motor 112. Operation of the transverse motion apparatus in the present example embodiment may include operation of the jack screw motors 107. In the present example embodiment, the jack screw motors 107 and the reel motor 112 may be electric motors. A signal from one of the bend sensors 114 indicative of bending strain in the coiled tubing 22 in one direction communicated to the controller 120 will cause the controller 120 to generate a signal to operate the jack screw motors 107 to move the guide roller frame 102 until the signal from the respective bend sensor is reduced to below a selected threshold. Detection of bending strain in the opposite direction by the other bend sensor 114 will cause the controller 120 to operate the jack screw motors 107 to move the guide roller frame in the opposite direction until the bending strain signal drops below a selected threshold. The controller 120 may be programmed to preferentially detect bending strain from one of the bend sensors 114 depending on the direction of rotation of the reel motor 112.

Bend in the coiled tubing may also be determined, for example, using visual observation or video detection such as by using a camera. In such implementations, a user of the apparatus may manually operate the transverse motion apparatus to cause the observed bend in the coiled tubing 22 to fall below a selected threshold.

A coiled tubing conveyance apparatus according to the present disclosure may enable performing coiled tubing operations in a well using a smaller deployment area than is possible using separate component coiled tubing apparatus known in the art prior to the present disclosure. Such coiled tubing apparatus may enable reducing environmental impact of well construction and intervention operations as well as enabling deployment of coiled tubing apparatus in hostile and/or remote environments such as sea floor operations. In coiled tubing operations such as subsurface soil evaluation, a coiled tubing conveyance apparatus according to the present disclosure may reduce the occurrence of bending in the coiled tubing as it penetrates such soils. Reducing such bending may improve the quality of evaluation of such soils by ensuring that soil evaluation reflects accurate measurement of soil properties with respect to measured depth.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A coiled tubing conveyance apparatus, comprising:
   a tubing injector;
   a guide roller frame having a coiled tubing reel attached thereto movably mounted on the tubing injector, the guide roller frame comprising at least one guide roller positioned on the guide roller frame to straighten a coiled tubing extended from the coiled tubing reel; and
   a transverse motion apparatus coupled to the tubing injector and the guide roller frame such that the guide roller frame is movable transversely with respect to a direction of motion of coiled tubing through the tubing injector, wherein the transverse motion apparatus comprises a linear bushing disposed between the guide roller frame and the tubing injector.

2. The coiled tubing conveyance apparatus of claim 1 wherein the transverse motion apparatus comprises jack screws and ball nuts.

3. The coiled tubing conveyance apparatus of claim 2 wherein at least one of the jack screws and the ball nuts is rotatably coupled to a motor.

4. The coiled tubing conveyance apparatus of claim 3 wherein the motor comprises an electric motor.

5. The coiled tubing apparatus of claim 1 further comprising at least one bend sensor disposed on at least one of the tubing injector and the guide roller frame.

6. The coiled tubing conveyance apparatus of claim 5 wherein the at least one bend sensor comprises a photoelectric sensor.

7. The coiled tubing conveyance apparatus of claim 5 wherein the at least one bend sensor comprises a strain gauge.

8. The coiled tubing conveyance apparatus of claim 5 further comprising a controller in signal communication with the at least one bend sensor, the controller in signal communication with a motor operatively coupled to the transverse motion apparatus, the controller configured to operate the motor in response to signals from the at least one bend sensor.

9. The coiled tubing conveyance apparatus of claim 8 wherein the controller is configured to operate the motor such that bending measured by the at least one bending sensor falls below a selected threshold.

10. A method for conveying coiled tubing, comprising:
positioning a guide roller frame having a coiled tubing reel attached thereto transversely movably above a tubing injector;
at least one of extending a coiled tubing from the reel through the tubing injector and retracting the coiled tubing onto the reel through the tubing injector;
determining bend in the coiled tubing; and
moving the guide roller frame transversely with respect to a direction of motion of the coiled tubing through the tubing injector until the determined bend falls below a selected threshold, the moving performed linearly using a linear bushing disposed between the guide roller frame and the tubing injector.

11. The method of claim 10 wherein the determining bend comprises measuring strain.

12. The method of claim 10 wherein the determining bend comprises optically measuring deflection.

13. The method of claim 10 wherein the moving the guide roller frame comprises rotating a motor coupled to a ball nut and jack screw.

14. A method for conveying coiled tubing, comprising:
positioning a guide roller frame having a coiled tubing reel attached thereto transversely movably above a tubing injector;
at least one of extending a coiled tubing from the reel through the tubing injector and retracting the coiled tubing onto the reel through the tubing injector;
determining bend in the coiled tubing; and
moving the guide roller frame transversely with respect to a direction of motion of the coiled tubing through the tubing injector until the determined bend falls below a selected threshold, wherein the moving the guide roller frame comprises rotating a motor coupled to a ball nut and jack screw.

15. The method of claim 14 wherein the determining bend comprises measuring strain.

16. The method of claim 14 wherein the determining bend comprises optically measuring deflection.

* * * * *